United States Patent [19]

Takikawa et al.

[11] Patent Number: 5,118,477
[45] Date of Patent: Jun. 2, 1992

[54] EXHAUST GAS CLEANING DEVICE

[75] Inventors: Kazunori Takikawa, Numazu; Haruo Serizawa, Shizuoka, both of Japan

[73] Assignee: Usui Kokusai Sangyo Kabushiki Kaisha, Japan

[21] Appl. No.: 517,876

[22] Filed: May 2, 1990

[30] Foreign Application Priority Data

May 8, 1989 [JP] Japan .................................. 1-113837

[51] Int. Cl.⁵ .............................................. B01J 8/02
[52] U.S. Cl. ..................... 422/179; 422/180; 502/527
[58] Field of Search ........ 422/171, 175, 177, 179–180, 422/211, 221–222; 502/527

[56] References Cited

U.S. PATENT DOCUMENTS

| | | | |
|---|---|---|---|
| 4,647,435 | 3/1987 | Nonnenmann | 422/180 |
| 4,731,229 | 3/1988 | Sperandio | 422/222 |
| 4,818,746 | 4/1989 | Cyron | 502/527 |
| 4,845,073 | 7/1989 | Cyron | 502/439 |
| 4,909,994 | 3/1990 | Nishizawa et al. | 422/179 |

*Primary Examiner*—Jill A. Johnston
*Attorney, Agent, or Firm*—Lowe, Price, LeBlanc & Becker

[57] ABSTRACT

An exhaust gas cleaning device is constructed of a honeycomb core body formed by superposing in a contiguous relation a planar band made of a metal sheet and a corrugated band made from another metal sheet one over the other. The honeycomb core body defines a number of network-patterned axial gas flow passages and is adapted to carry an exhaust gas cleaning catalyst thereon. The planar band has alternating rugged sections and flat sections of desired lengths.

13 Claims, 3 Drawing Sheets

EXHAUST GAS CLEANING DEVICE

BACKGROUND OF THE INVENTION

1) Field of the Invention

The present invention relates to an exhaust gas cleaning device constructed of a metal-made honeycomb core body for carrying an exhaust gas cleaning catalyst. As a cleaning means for exhaust gas from a motor vehicle, the exhaust gas cleaning device is generally installed at an intermediate point of an exhaust pipe.

More specifically, this invention is concerned with an exhaust gas cleaning device of the above sort, which is employed under severe conditions. The exhaust gas cleaning device features the use of a metal-made honeycomb core body with improved resistance to deformations and breakage by thermal expansion and stress.

2) Description of the Related Art

Exhaust gas cleaning devices of the above sort have conventionally been fabricated in the following manner. Namely, a planar band made of a heat-resistant steel sheet and a corrugated band obtained by forming a similar steel sheet into a wavy or sinuous form are superposed one over the other in a contiguous relation and rolled together into a multi-layered spiral form or are superposed in, layers, thereby forming a honeycomb-shaped multi-layered composite body (hereinafter called the "honeycomb core body") axially defining a number of network-patterned gas flow passages for allowing exhaust gas to flow therethrough. The honeycomb core body is then inserted into a cylindrical metal casing which are opening in both ends thereof.

The honeycomb core body and metal casing are thereafter firmly joined together by brazing or welding, so that they can withstand thermal expansion and stress due to the high temperature of exhaust gas, exothermic reactions of exhaust gas induced by the catalyst and the like and further vibrations while the associated motor vehicle is running. Needless to say, the planar and corrugated bands which make up the honeycomb core body can be firmly joined together at contacts therebetween by any one of various suitable methods.

There is however a recent move toward constructing an exhaust gas cleaning device without a metal casing which is adapted to receive and firmly fix a metal-made honeycomb core body, in other words, with the metal-made honeycomb core body alone from the stand point of the price competition with conventional cordierite ceramic carriers. The omission of such a metal casing naturally leads to a reduction in the cost for inserting a metal-made honeycomb core body in the metal casing and then uniting them together, namely, in the so-called canning cost, whereby a substantial cost merit can be brought about.

Neither the conventional exhaust gas cleaning devices constructed of a honeycomb core body alone nor the conventional exhaust gas cleaning devices constructed of a honeycomb core body and a metal casing can however withstand long-term application for the following reasons. In directions perpendicular to the longitudinal axis of the honeycomb core body (hereinafter called "radial directions of the honeycomb core body"), to say nothing of the axial direction of the honeycomb core body (namely, the direction in which exhaust gas flows in and passes through), deformation forces are produced by thermal expansion and thermal stress occurred in an atmosphere of high temperature due to the elevated temperature of exhaust gas itself and heat generated by a catalytic reaction of unburnt gas. These deformation forces then concentrate in the vicinity of the outer periphery of the honeycomb core body or around the areas of contacts between the outer peripheral wall of the honeycomb core body and the inner peripheral wall of the associated metal casing by way of the elements (i.e., the planar band and corrugated band) of the honeycomb core body. Namely, the large deformation forces caused by the aforementioned thermal expansion and thermal stress concentrate in the vicinity of the outer periphery of the honeycomb core body or around the areas of contacts between the outer peripheral wall of the honeycomb core body and the inner peripheral wall of the associated metal casing. The planar band and/or corrugated band, which make up the honeycomb core body, undergo substantial cracking and breakage at such locations, and dropping or separation takes place at the areas of contact between the respective bands and also at the areas of contact between the honeycomb core body and the metal casing.

With a view toward improving the joining strength at the areas of contact between a planar band and a corrugated band, it has been known to use a planar band which includes curved concave sections having the same radius of curvature as the curved convex sections (i.e., ridges) of an associated planar band, in other words, a wavy band having the same radius of curvature [Japanese Patent Application Laid-Open (Kokai) No. 30651/1989]. Although it is the primary object of this technique to improve the joining strength at the areas of contact between the planar band and the corrugated band, the production of thermal stress by the difference in thermal expansion between the planar band and the corrugated band can also be reduced as a result. However, this reduction is still insufficient.

In order to make an exhaust gas cleaning device of this sort, especially, a honeycomb core body successfully withstand thermal deformations as described above, corrections are needed to the belief that it is only necessary to establish firm joining or unification between a planar band and an associate corrugated band, which make up the honeycomb body, or between the outer peripheral wall of the honeycomb body and the inner peripheral wall of an associated metal casing.

SUMMARY OF THE INVENTION

With a view toward overcoming the above-described drawbacks of the conventional exhaust gas cleaning devices, the present inventors have conducted an extensive investigation. As a result, it has been found that large deformation forces to be caused by thermal expansion and thermal stress, said deformation forces being to be transmitted radially in a honeycomb core body, can be effectively absorbed and reduced by forming into a special shape the planar band out of the elements (planar band and corrugated band) making up the honeycomb core body, leading to the completion of the present invention.

In one aspect of the present invention, there is thus provided an exhaust gas cleaning device which is constructed of a honeycomb core body formed by superposing in a contiguous relation a planar band made of a metal sheet and a corrugated band made from another metal sheet one over the other. The honeycomb core body defines a number of network-patterned axial gas flow passages and is adapted to carry an exhaust gas cleaning catalyst thereon. The planar band forming the honeycomb core body has alternating rugged sections and flat sections of desired lengths.

The metal-made honeycomb core body—principal element of the exhaust gas cleaning device—has been fabricated by superposing the planar band, which has each of the flat sections (a) and an adjacent one of the rugged sections (b) as a unit length (l) of one cycle, and the corrugated band in the contiguous relation. The present invention can therefore bring about the following excellent advantageous effects:

(1) Large radial deformation forces which occur in the honeycomb core body due to heat can be absorbed and reduced at the rugged section (b) in the unit length (l) of each cycle. It is therefore possible to effectively prevent the breakage or cracking of the individual elements making up the honeycomb core body and the separation of the honeycomb core body from the metal casing and vice versa, said breakage or cracking and separation being caused especially by thermally-induced deformation forces concentrated on the areas in the vicinity of the outer peripheral wall of the honeycomb core body, and also the peeling-off of wash coat layers and the peeling-off and separation of expensive catalyst layers.

(2) Owing to the formation of the rugged section (b) in the unit length (l) of each cycle of the planar band, it is possible to have the honeycomb core body carry an exhaust gas cleaning catalyst in a greater quantity, thereby making it possible to improve the cleaning performance for the exhaust gas.

(3) Since the rugged section (b) is formed in the unit length (l) of each cycle of the planar band, the flat sections may be kept out of contact with the tops of the corresponding ridges (or the bottoms of the corresponding grooves) of the corrugated band to define spacings (S) therebetween. The formation of these spacings (S) makes it possible to reduce the amount of an expensive brazing material to be used. In addition, the formation of the spacings (S) has enlarged the catalyst-carrying surface area and has also made it possible to impart turbulence to the flow of exhaust gas (turbulent effects). As a result, the contact between exhaust gas and the exhaust gas cleaning catalyst is improved, so that the efficiency of cleaning of the exhaust gas can be improved.

DETAILED DESCRIPTION OF THE INVENTION AND PREFERRED EMBODIMENTS

Figure 1:
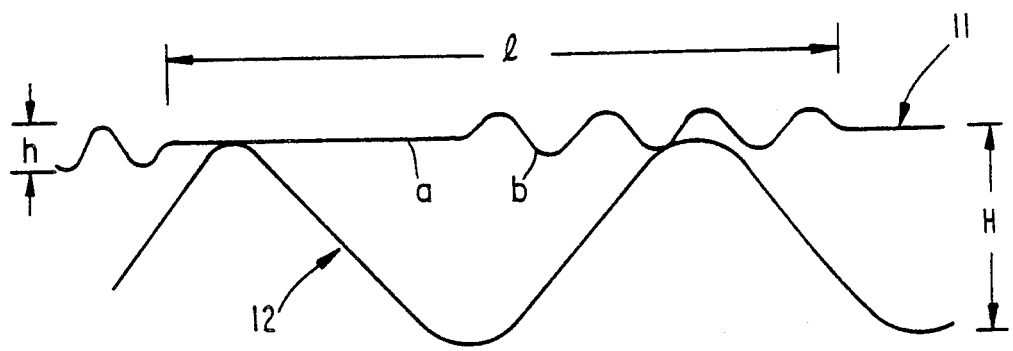
FIG. 1 is a fragmentary schematic illustration showing the shape of a planar band employed in an exhaust gas cleaning device according to a first embodiment of the present invention.

In a exhaust gas cleaning device making use of a metal-made honeycomb core body, it is extremely important to impart sufficient durability against deformation forces to be produced by thermal expansion and/or thermal stress (strain).

Durability against heat is an extremely important requirement for a metal-made exhaust gas cleaning device of this sort, because the device is exposed to a thermally severe environment during running, to say nothing of the alternating thermal loads of the heating and cooling cycles to which the cleaning device undergoes upon re-starting and stopping of operation.

Situations during running are now considered from this standpoint. In the exhaust gas cleaning device, the honeycomb core body is exposed to higher temperatures at a central part thereof than at a peripheral part thereof because of the difference in the flow rate distribution of exhaust gas (i.e., the difference between the flow rate through the central part and that of the peripheral part) and catalytic reactions (exothermic reactions) of exhaust gas induced by an exhaust gas cleaning catalyst, such as Pt, Pd or Rh, carried on surfaces of the honeycomb core body. Incidentally, the temperature of an exhaust gas cleaning device of this sort generally ranges from 700° C. to 800° C. It however reaches as high as 1,200° C. or so where a lot of HC (hydrocarbons) is exhausted.

Describing in further detail the above-described temperature gradient within the honeycomb core, the temperature gradient in the portion ranging from the peripheral part of the honeycomb core body to a part a little inside the peripheral part is much greater than that in a portion near the central part. This tendency is exaggerated because the outer peripheral wall of the honeycomb core body is exposed directly to the outdoor air or the honeycomb core body is fixed in a cylindrical metal casing exposed to the outdoor air.

In an exhaust gas cleaning device constructed of a honeycomb core body alone (i.e., of the type not using a metal casing) or an exhaust gas cleaning device constructed of a honeycomb core body and a metal casing, strong deformation forces by thermal expansion and thermal stress—which may hereinafter be referred to as "heat-induced deformation forces"—concentrate on a low-temperature portion adjacent to the outer peripheral wall of the honeycomb core body from a high-temperature central part of the honeycomb core body, namely, in the radial direction of the honeycomb core body as a result of transmission of heat through the elements (the planar band and corrugated band) of the honeycomb core body.

These large deformation forces, which are produced by heat in the radial direction of the honeycomb core body, will cause separation or dropping of the elements (the planar band and corrugated band) of the honeycomb core and also cracking and breakage in the individual elements, especially in the portion adjacent to the outer peripheral wall of the honeycomb core body as the time goes on.

Concurrently with these separation, dropping, cracking and breakage, expensive catalyst layers borne on the surfaces of the respective elements are also caused to peel off, resulting in a reduction in the cleaning performance for exhaust gas. The same problem is also observed on an exhaust gas cleaning device in which a honeycomb core body is inserted within a metal casing and the honeycomb core body is firmly secured at the outermost peripheral wall thereof on the inner peripheral wall of the metal casing.

To solve or improve the above-described drawbacks such as peeling-off, it is therefore indispensable to provide the honeycomb core body with a means for absorbing and reducing deformation forces which are produced especially in the radial direction of the honeycomb core body by thermal expansion and thermal stress.

The present invention has therefore adopted the technical feature that out of the planar and corrugated bands of heat-resistant metal sheets which are elements of the honeycomb core body, the planar band is formed in a shape suitable for the absorption and reduction of the abovementioned heat-induced deformation forces. Described more specifically, the planer band is formed in such a shape as having alternating rugged sections b and flat sections a, in other words, in a shape such that unit lengths (l) each of which consists of a single cycle of a rugged section b of a desired first length and a flat section a of a desired second length are connected continuously.

Technical features and preferred embodiments of the present invention will hereinafter be described in more detail on the basis of the accompanying drawings. It should however be borne in mind that the present invention are not limited to those illustrated in the drawings.

Figure 6:
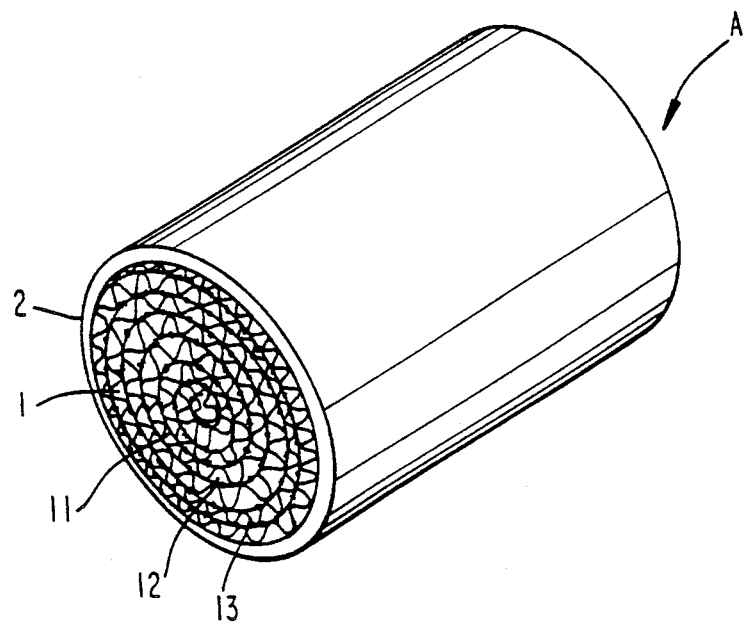
FIG. 6 is a perspective view of a rolled-multilayer-type exhaust gas cleaning device according to the present invention.
Figure 7:
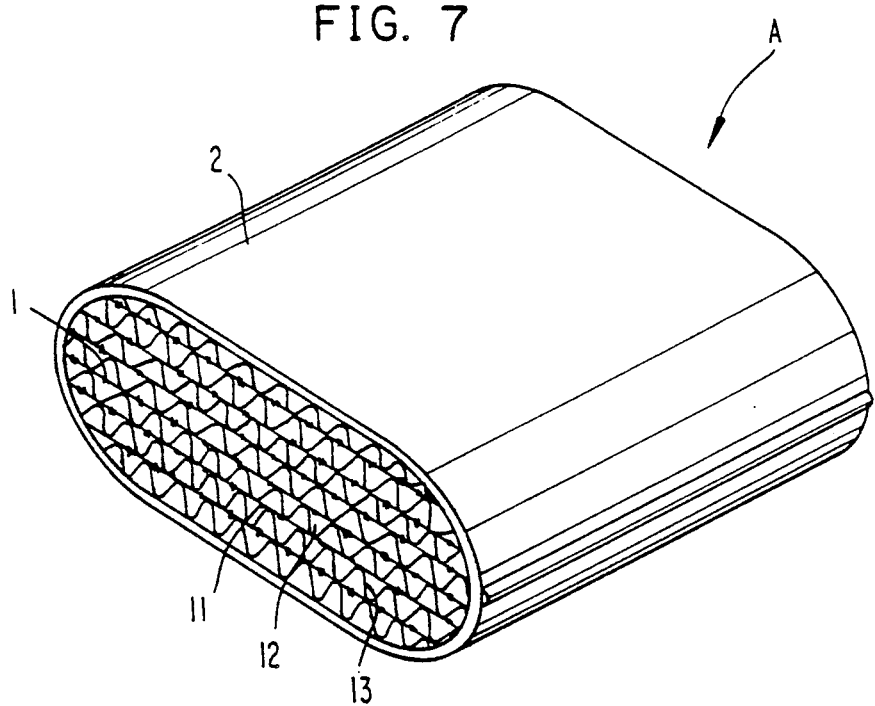
FIG. 7 is a perspective view of a superposed-multilayer-type exhaust gas cleaning device according to the present invention.

In the present invention, the metal-made honeycomb core body is such a body as shown in FIG. 6 or FIG. 7 and is fabricated in a conventional manner.

As depicted in FIG. 6, a honeycomb core body 1 is fabricated by superposing a planar band 11 and a corrugated band 12 one over the other in a contiguous relation and then rolling them together into a multi-layered spiral form with the outermost peripheral wall being formed of the planar band. The planar band 11 is formed of a heat-resistant steel sheet and has a thickness of about 0.03–0.1 mm, while the corrugated band 12 has been obtained by corrugating a similar steel sheet into such a special waveform as will be described subsequently. By the rolling into the multi-layered spiral form, there are automatically formed a number of network-patterned axial gas flow passages 13 which serve as flow passages for exhaust gas. As an alternative, the honeycomb core body 1 can also be fabricated by superposing a planar band 11 and a corrugated band 12, which has been corrugated to have such a special waveform as will be described subsequently, in a contiguous relation and then stacking them in layers as illustrated in FIG. 7.

As the planar band 11, there is used a 0.04–0.1 mm thick sheet which is made of a heat-resistant stainless steel such as chromium steel (chromium content: 13–25%) or Fe-Cr20%-Al5% or is made of a heat-resistant stainless steel formed by adding a rare earth metal to the former stainless steel to improve the oxidation resistance. As the corrugated band 12, a similar stainless steel sheet is used after its corrugation, for example, by feeding the same between forming gears. Use of an Al-containing stainless steel sheet as each of the bands is preferred because $Al_2O_3$ is formed as whiskers on the surfaces of the band by heat treatment and serves to firmly hold a wash coat adapted to bear an exhaust gas cleaning catalyst.

A description will next be made of the planar band 11 of the special shape, which constitutes the greatest technical feature of the present invention.

FIG. 1 shows the shape of the planar band 11, which is employed in the exhaust gas cleaning device according to the first embodiment of the present invention, around desired areas of contact between the planar band 11 and the associated corrugated band 12.

As is depicted in FIG. 1, the planar band 11 has alternating flat sections a and rugged portions b of a substantially sinusoidal waveform. In other words, the planar band 11 has the shape that unit lengths (l) each of which consists of a single cycle of one of the rugged sections b and an adjacent one of the flat sections a are connected continuously. In the unit length (l) of each cycle in the planar band 11, the length of the flat section a and that of the corrugated section b may be equal or different. The rugged section b in the unit length (l) of each cycle may be of any shape as long as one or more cycles, each consisting of a recess and a swell, are contained.

Figure 2:
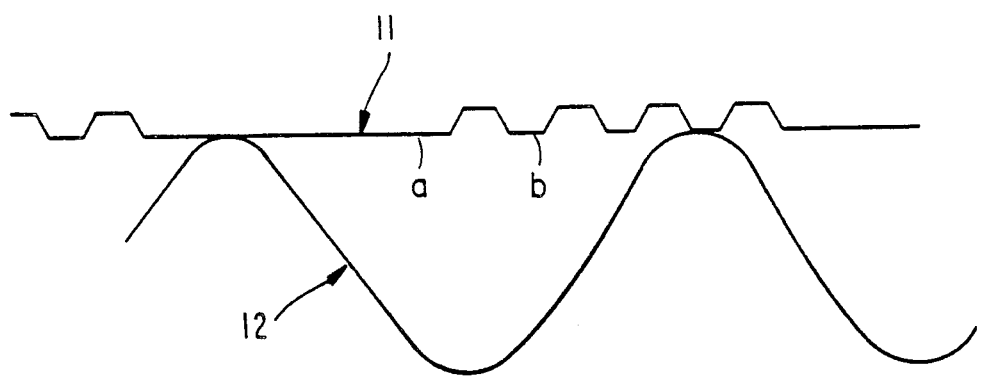
FIG. 2 is a fragmentary schematic illustration showing the shape of a planar band employed in an exhaust gas cleaning device according to a second embodiment of the present invention.

In the present invention, the rugged sections b of the planer band 11 can have a waveform of a substantially trapezoidal shape as illustrated in FIG. 2 or a waveform of any other suitable shape.

In this invention, the height (h) between the bottom of each recess and the top of each swell in the rugged section b of the planer band 11 can be determined in relation to the height (H) between the top of each ridge and the bottom of each groove of the corrugations in the corrugated band 12. Needless to say, the adhesion of a wash coat layer to be applied to the surfaces of the planar band 11 (i.e., a wash coat layer for bearing an exhaust gas cleaning catalyst), in other words, the prevention of separation or drop of the wash coat layer, the degrees of absorption and reduction of heat-induced deformation forces, the rigidity of the honeycomb core body, and the like are taken into parallel consideration here. In view of these, the height (h) of the rugged section is generally determined to satisfy the formula:

$$1/10 H \leq h \leq \tfrac{1}{2} H.$$

Figure 3:
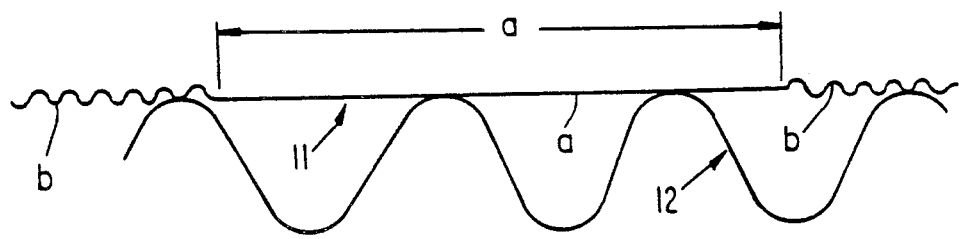
FIG. 3 illustrates the relationship between the unit length of one cycle of the planar band employed in the device according to the first embodiment of the present invention and the pitch of the waveform of an associated corrugated band.
Figure 4:
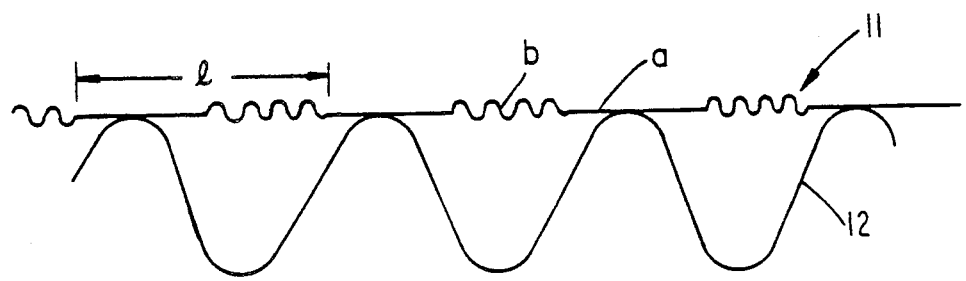
FIG. 4 illustrates the relationship between the unit length of one cycle of the planar band employed in the device according to the second embodiment of the present invention and the pitch of the waveform of an associated corrugated band.

From the standpoint of absorption and reduction of heat-induced deformation forces in particular, the unit length (l=a+b) of one cycle in the planar band 11 which consists of the planar sections a and the rugged sections b and the pitch of the waveform of the corrugated band 12 can have a relationship as shown in FIG. 3 or FIG. 4.

In FIG. 3, the length of the flat section a in the unit length (l) of one cycle of the planar band 11, said one cycle consisting of one of the flat sections a and one of the rugged sections b, is shown to be shorter than 3 pitches of the waveform of the corrugated band 12. In this case, no excessive deformation force is applied to the flat sections a because when a heat-induced large deformation force is applied to the planar band 11, the deformation force is absorbed in and reduced by the rugged sections b,b on both ends as shown in the drawing.

In FIG. 4, the unit length (l) of one cycle consisting of one of the flat sections a and an adjacent one of the rugged sections b of the planar band 11 is the same as the pitch of the waveform of the corrugated band 12, so that a heat-induced deformation force can be absorbed and reduced to the maximum degree.

As has been described above, the present invention has made it possible to effectively absorb and reduce heat-induced deformation forces by forming the planar band 11 of the honeycomb core body 1 into such a special shape as described above. By forming the planer band 11 into the above-described shape in the present invention, the following secondary effects can also be obtained. This is illustrated in FIG. 5.

Figure 5:
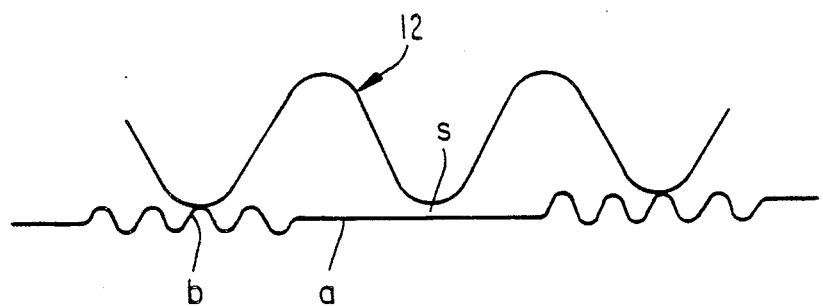
FIG. 5 is an enlarged view of an area of contact between a planar band and a corrugated band and its vicinity section.

FIG. 5 shows on an enlarged scale a few areas of contact between the planer band 11 and the corrugated band 12 in FIG. I as well as vicinity areas. Because of the relative arrangement of both the bands, a spacing S is formed at a location as shown in the drawing. In FIG. 5, a ridge (or groove) of the corrugations of the corrugated band 12 is out of contact with the corresponding flat section a of the planar band, whereby the spacing S is formed there. In a honeycomb core body 1 constructed of a planar band 11 of this sort and a corrugated band 12, an expensive high-temperature brazing material, for example, a nickel-base brazing material is usually employed at areas of contact between the planar band and the corrugated band. The formation of such spacings S therefore makes it possible not only to decrease the amount of such a brazing material to be used but also to enlarge the catalyst-bearing surface area and further to convert the flow of exhaust gas into a turbulent flow (disturbing or agitating action). As a result, the contact between the exhaust gas and the exhaust gas cleaning catalyst can be improved.

The honeycomb core body which has been fabricated from the planar band 11 of the special shape described above and the corrugated band 12 can be used as an exhaust gas cleaning device by itself. In such a case, an end portion of the planar band, said end portion being free of rugged sections, can be wound a desired number of times around the outermost periphery of the honeycomb core body 1 as a substitute for a metal casing. As a further alternative, the honeycomb core body 1 can be inserted in and fixed to a separate cylindrical metal casing to provide an exhaust gas cleaning device.

In the present invention, no particular limitations are imposed on the shape of the metal casing 2 in which the honeycomb core body 2 is inserted and fixed, as long as the metal casing 2 is open at both ends. Metal casings having a circular cross-section and a racetrack-shaped (i.e., oval) cross-section respectively are shown in FIG. 6 and FIG. 7, respectively. The present invention is however not limited to the use of such metal casings. For example, to be fitted in a space underneath a vehicle body, an exhaust gas cleaning device can be constructed using a metal casing of a substantially triangular cross-section. As the material of the metal casing, it is possible to use the same heat-resistant steel as the honeycomb core body or to employ a metal having high heat and corrosion resistance. In addition, it is also possible to use a double-layered material with an outer layer being made of a metal material having higher heat and corrosion resistance than the metal material of an inner layer, specifically to employ a clad steel made of a ferritic stainless steel as an inner layer and an austenitic stainless steel as an outer layer.

What is claimed is:

1. In an exhaust gas cleaning device constructed of a honeycomb core body formed by superposing in a contiguous relation a planar band made of a metal sheet and a corrugated band made form another metal sheet one over the other, said honeycomb core body defining a number of network-patterned axial gas flow passages and adapted to carry an exhaust gas cleaning catalyst thereon, the improvement comprising said planar band having a plurality of unit lengths (l), each unit length of one cycle and further comprising a flat section of a desired length (a) and an adjacent rugged section of a desired length (b), and having a longitudinal axis such that (a+b)=l, said unit lengths being connected continuously to form said planar band, each said rugged section containing at least one cycle of a recess and an adjacent swell, said longitudinal axis of each said rugged section and each said flat section lying in the same plane, and wherein said rugged sections are designed to absorb heat-induced deformation forces in said planar band.

2. The device of claim 1, wherein the rugged sections of the planar band have a substantially sinusoidal waveform.

3. The device of claim 1, wherein the rugged sections of the planar band have a substantially trapezoidal waveform.

4. The device of claim 1, wherein the planar band and the corrugated band satisfy the following formula:

$$1/10 H \leq h \leq \tfrac{1}{3} H$$

wherein
h: the height of the rugged section of the planar band, and
H: the height of the corrugated band.

5. The device of claim 1, wherein the length of the flat section is not longer then 3 pitches of the waveform of the corrugated band.

6. The device of claim 1, wherein the length of the flat section is not longer than 1 pitch of the waveform of the corrugated band.

7. The device of claim 1, wherein the rugged section and the flat section have the same length.

8. The device of claim 1, wherein the rugged section and the flat section have different lengths.

9. The device of claim 1, wherein the honeycomb core body has been formed by superposing the planar band and the corrugated band in the contiguous relation and then rolling the planar band and the corrugated band together into a multi-layered spiral form.

10. The device of claim 1, wherein the honeycomb core body has been formed by superposing the planar band and the corrugated band in layers and in the contiguous relation.

11. The device of claim 1, further comprising a metal casing in which the honeycomb core body is fixedly secured.

12. The device of claim 11, wherein the metal casing has a circular cross-section.

13. The device of claim 11, wherein the metal casing has an elliptically-shaped cross-section.

* * * * *